Inventor:
Horst Döpner
By: George L. Spencer
Attorney

Aug. 24, 1965    H. DÖPNER    3,202,248
ELECTROMAGNETIC CLUTCH AND BRAKE WITH MEANS TO ENERGIZE
BOTH WINDINGS DURING TRANSITION
Filed Aug. 7, 1961    2 Sheets-Sheet 2

*Inventor:*
Horst Döpner
By: *George L. Spencer*
Attorney

United States Patent Office 3,202,248
Patented Aug. 24, 1965

3,202,248
ELECTROMAGNETIC CLUTCH AND BRAKE WITH MEANS TO ENERGIZE BOTH WINDINGS DURING TRANSITION
Horst Döpner, Konstanz (Bodensee), Germany, assignor to Telefunken Patentverwertungs-G.m.b.H., Ulm (Danube), Germany
Filed Aug. 7, 1961, Ser. No. 129,889
Claims priority, application Germany, Aug. 11, 1960, T 18,831
9 Claims. (Cl. 192—18)

The present invention relates generally to controlled driving devices, and, more particularly, to those which provide varying speeds for the driven element under the influence of controlled conditions, especially for bringing about adjusting movements.

For example, in drives for magnetic tapes serving as digital storage devices for electronic computers, there exists the problem of operating the portion of the tape cooperating with the magnetic head intermittently, with sudden starts and sudden stops. Also, the speed of the reels must be adjusted to this operation. It is known to form tape loops between the operating portion of the tape and the winding reels which permit sudden withdrawing and supplying of tape and control of the rotation of the winding reels in the sense of keeping the length of the tape loop approximately equal, a fast adjustment of the winding speeds being desirable so as to keep the loop lengths limited. These speeds vary from standstill to a maximum value, possibly in both directions of rotation. In this case, as well as in other cases where the essential point is to achieve a controlled speed with fast variation, electromagnetic couplings may be used to advantage, which, moreover, require less control power than follower motors.

It has already been proposed to use electromagnetically controlled disk couplings in tape drives of the type mentioned. Such couplings permit continuous varying of the driving torque by varying the frictional pressure and thereby the controlled slip. For initiating operation from a standstill, electromagnetic couplings are suitable which have two exciter windings, a braking winding for use in coupling via an armature the driven end of the shaft with a stationary part, and a driving winding for use in coupling via an armature the driven end of the shaft with a rotating part. There are also known designs which, by spring pressure, keep the driven end in continuous contact with both the stationary braking part as well as with the rotating driving part, in order to avoid even a slight loss of time in reversing the coupling. This also counteracts sudden variations of the driving torque at the start of driving from a standstill.

With these types of devices, the curve representing the ratio between the torque and the exciter current is a quadratic curve, based on the approximate relationship $$P = k \times B^2 = k_1 \times i^2$$

($P$=force, $B$=induction, $i$=current). Therefore, the curve has a zero slope at the origin, as shown in FIGURE 1. After the quadratic slope, the curve changes direction in the region of magnetic saturation, as indicated by the dashed line, and turns towards the direction of the abscissa or $i$ axis. If the characteristic of the driving winding and the characteristic of the braking winding are plotted, with the torque T as a function of the braking current $i_B$ and the driving current $i_D$, the over-all curve of FIGURE 2 is obtained, both branches of which enter the origin horizontally. This is disadvantageous since in the transition from starting to braking, and vice versa, a large change of the current is required in order to achieve any effect at all. In the region between the parallel dashed lines, there is no definite relation between input signal and controlled output because the portion of the curve disposed in this region may be considered as a substantially horizontal line from the point of view of control technology. This may, for example, result in a closed control loop wherein the input signal continuously oscillates between plus and minus values, the operating region of the system being about the origin of the current-torque characteristic.

With these defects of the prior art in mind, it is a main object of the present invention to provide a coupling of the type described which has definite continuous control and effective suppression of deviations from desired values.

Another object of the invention is to reduce the large variation of current required when starting and when braking to a stop.

Another object is to provide such a device wherein the magnetic air gaps are equal or as close as possible to zero.

These objects and others ancillary thereto are accomplished according to preferred embodiments of the invention which is based on the realization that to obtain a definite continuous control or an effective suppression of deviations from the desired value, especially when starting and stopping, consideration must be given to the shape of the curve.

According to the present invention, a current-torque characteristic is obtained which, at the point where torque equals zero, has a slope, that is to say, a slope that is not equal to zero. More particularly, the current-torque characteristic, in the region where torque equals zero, will be rectilinear. This is achieved by shifting one of the two branches of the current-torque characteristic in the direction of the abscissa (the current ($i$) axis), so that two torque (T) values are obtained for any one current value. As shown in FIGURE 3, the two curves are added to produce an addition curve S which represents the torque available at the driven part and which, at the point where $T=0$, has the desired slope, indicated by $\alpha$.

In practice, the above-described current-torque characteristic is achieved by supplying current to both the driving exciter winding and to the braking exciter winding, the rectilinearity of the curve, as it passes through the $T=0$ point, being obtained by letting the current increase in one winding be accompanied by a corresponding current decrease in the other.

In order to provide such a mode of operation, the effective magnetic air gaps in the transition between driving and braking should be kept constant, as should the frictional wear and tear, and, furthermore, they should, as far as is possible, be made zero, or as close to zero as possible.

Additional objects and advantages of the present invention will become apparent upon consideration of the following description when taken in conjunction with the accompanying drawings in which.

Figure 4:
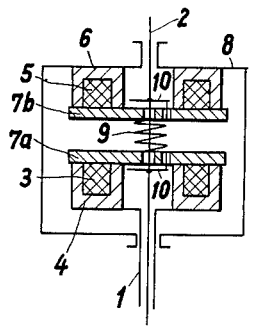
FIGURE 4 is a diagrammatic sectional view of one embodiment of the invention.

Referring now to the drawings and to FIGURE 4 thereof in particular, there is shown a drive incorporating a driving part 1 and a driven part 2; a driving winding 3 arranged within an annular magnetic yoke 4; a braking winding 5 arranged within a similarly designed magnetic yoke 6; two disk-shaped armatures 7a and 7b cooperating with yokes 4 and 5, respectively, these armatures 7a and 7b also serving as friction coupling disks; a stationary frame or housing 8 within which these parts are arranged; a compression spring 9 which urges the disks 7a and 7b apart and into engagement with their respective yokes; and elements with carrier bolts for rotational entrainment shown schematically at 10, these elements engaging the disks 7a and 7b and allowing slight axial displacement of the parts which are connected for common rotation.

The driving system 3, 4, is connected to the driving part 1, whereas the braking system 5, 6, is connected to the stationary frame or housing 8.

Figure 5:
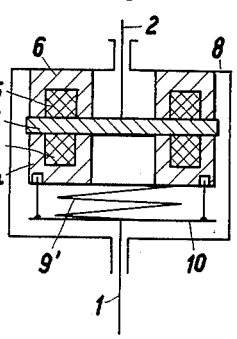
FIGURE 5 is a diagrammatic sectional view of another embodiment of the invention.

The embodiment of FIGURE 5 differs from that of FIGURE 4 in that there is but a single friction armature disk 7 which is connected with the driven part 2, the spring 9' being interposed between the yoke 4 and the single entrainment element 10. Thus, the yoke 4 is pressed against the disk 7 and the latter against the yoke 6.

Figure 6:
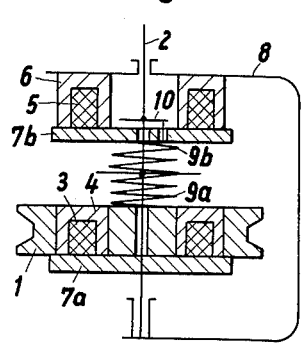
FIGURE 6 is a diagrammatic sectional view of a further embodiment.

The embodiment of FIGURE 6 is similar to that of FIGURE 4, in that it incorporates two friction disks 7a and 7b, the former being connected to the driven part 2 and the latter being coupled to entrainment element 10. A spring 9a presses the yoke 4, which is shown as a driving pulley, against the disk 7a, whereas a spring 9b presses the disk 7b against the yoke 6.

A second friction pair, designed as the friction pair 4, 7a, may be arranged here having a driving belt pulley running in the opposite direction in order to obtain controlled driven ends in both directions. The driving curves of FIGURE 3 (right-hand and left-hand branch) of the two drives would overlap in the same manner.

In all of the coupling devices disclosed, there is a continuous frictional connection effected by spring pressure between the driven end of the shaft, on the one hand, and the driving ring as well as the braking ring, on the other hand. The torque driving the driven end of the shaft is controlled, in the sense of driving or braking, by the above illustrated current control for the windings and the effected control of the frictional biasing pressure.

Figure 7:
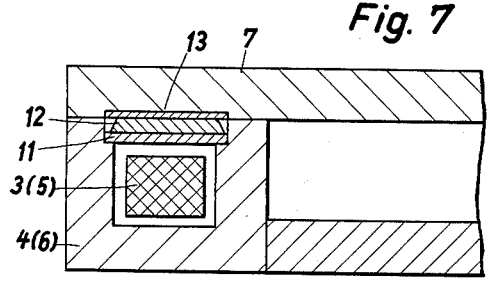
FIGURE 7 is an enlarged fragmentary sectional view of a construction for maintaining the air gap at a minimum.

The above-mentioned conditions for the air gap may be accomplished by a device such as that shown in FIGURE 7. The annular groove of the magnetic yoke ring 4 or 6 containing the exciter winding 3 or 5 has a shoulder carrying a metal ring 11 inserted in the groove. This metal ring is provided with a coupling friction coating 12 on its outer surface. The friction armature disk 7, which is resiliently pressed against the surface of the magnetic yoke ring, has an annular groove of small depth. This groove is filled with a very hard and very smooth layer 13, for example, a chromium layer. This layer contacts the coupling coating 12 when, at the latest during the initial running-in phase of the coupling, the iron of the disk 7 and of the magnetic yoke ring 4 (or 6) is ground off sufficiently. Since the ground surfaces between the disk and yoke ring form the air gap, this gap is practically equal to zero while the coupling friction is now predominantly between the coating 12 and the chromium layer 13, which parts suffer virtually no wear. However, insofar as some slight wear does take place, the softer iron surfaces of magnet ring and disk will grind themselves down on one another at the same time, so that the air gap remains unchanged and stays practically equal to zero.

Figure 8:
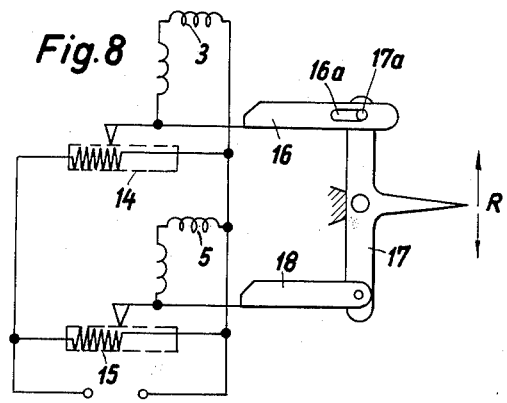
FIGURE 8 is a diagrammatic view of a device for controlling the currents in the exciter windings.

FIGURE 8 shows, in simple form, a device for controlling the currents for the exciter windings. The driving winding 3 and the braking winding 5 obtain their current via linear potentiometers 14 and 15, respectively. The taps of the potentiometers are displaced in opposite directions by the lever system 16, 17, 18, as a function of the input R. The pivot point connecting 16 and 17 may be changed by relatively displacing the pin 17a, carried by lever 17, in the slot 16a of lever 16. If the pin 17a is at the left end of the slot, then, in the lever position shown, both potentiometer taps would be at the zero end of the potentiometer. In this position, depending upon the direction of R, a linearly rising exciter current is switched in either for the driving winding 3 or the braking winding 5. By displacing the pin 17a to the right relative to the slot 16a, the overlapping or linear portion is adjusted wherein both exciter windings obtain current, with the current in one winding rising, with variations of R, to the same extent to which it drops in the other winding. The neutral point of the R indicator must, of course, be reset by an amount corresponding to one-half of the displacement.

Figure 1:
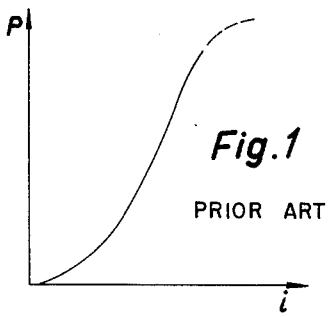
FIGURE 1 illustrates a torque curve of prior art devices as previously discussed.
Figure 2:
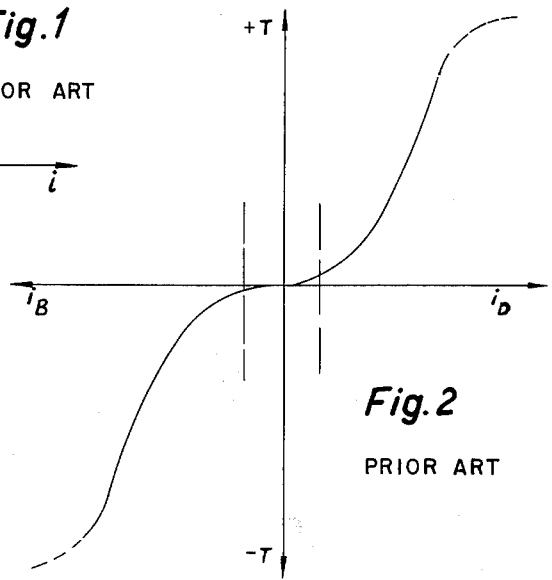
FIGURE 2 illustrates a torque and braking curve of prior art devices as discussed above.
Figure 3:
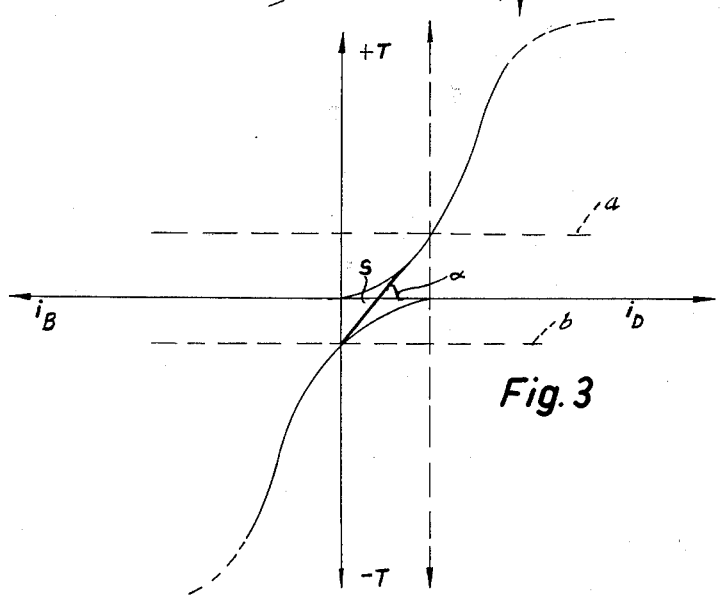
FIGURE 3 illustrates a torque and braking curve as provided by the present invention.

With such an arrangement, there will be current in both windings during a transition condition between a regular drive condition and a regular brake condition. In FIGURE 3, horizontal dashed line $a$ represents the upper limit of the transition condition above which there will be current only in the drive winding (drive condition). Dashed line $b$ represents the lower limit of the transition condition below which there will be current only in the brake winding (the brake condition).

It will be understood that the above description of the present invention is susceptible to various modifications, changes, and adaptations, and the same are intended to be comprehended within the meaning and range of equivalents of the appended claims. For example, the electromechanical connecting means shown in FIGURE 8 may readily be replaced by an electrical system operating in analogous manner, such as a circuit incorporating grid-controlled tubes for supplying the exciter currents, in which case the overlapping region can be adjusted by varying the grid bias.

What is claimed is:

1. In a controlled driving device with electromagnetically actuated friction coupling elements for transmitting a driving moment and a braking moment to the driven part of the device, the combination which comprises: a driving exciter winding and a braking exciter winding; and means for supplying current to both said windings for obtaining a current-torque characteristic which has a slope at the point where torque equals zero and for supplying only said driving winding with current in a regular drive condition of the device, only said braking winding with current in a regular brake condition of the device, and both said windings with current during a transition condition from regular drive condition to regular brake condition and vice versa in which transition condition when the current in one winding increases, the current in the other winding decreases.

2. The combination as defined in claim 1 wherein the coupling friction coupling, the combination elements are formed with opposite grooves within which there are arranged, respectively, cooperating friction members made of material harder than that of which said magnetic elements are made, whereby opposing surfaces of said magnetic elements will be ground while the frictional engagement is taken up by said friction elements so that the gap between said opposing surfaces of said magnetic elements will remain substantially constant.

3. An electromagnetically actuated friction clutch device, comprising, in combination:
  (a) a driving assembly including a driving winding for actuating it for transmitting a driving moment to the driven part of the device;
  (b) a brake assembly including a brake winding for actuating it for transmitting a braking moment to the driven part of the device; and
  (c) current control means connected to said windings for supplying a variable exciting current thereto which may selectively excite
    (1) only the driving winding in the "a regular drive" condition, (2) only the brake winding in the "a regular brake" condition, (3) both the driving and brake windings during transition from "regular drive" to "regular brake" condition and vice versa during which the exciting currents are small and for a single current the moment, when the current changes, changes only a little, and the current in one winding increases when the current in the other winding decreases.

4. The combination defined in claim 3 wherein the assembly for transmitting the driving moment as well as the assembly for transmitting the braking moment are resiliently maintained in frictional contact.

5. The combination defined in claim 3 wherein the assembly is so arranged that magnetic air gaps are maintained substantially constant.

6. The combination as defined in claim 3 wherein there is substantially no space between the friction coupling elements.

7. An electromagnetically actuated friction clutch device as defined in claim 3 wherein said current control means include a linear potentiometer for each winding, said potentiometers being interconnected.

8. The combination defined in claim 5 wherein said air gaps are maintained substantially at zero.

9. An electromagnetic device, comprising, in combination:
(a) a drive element;
(b) a driven shaft;
(c) a stationary brake winding adjacent said driven shaft;
(d) a coupling winding, mounted on said driving element;
(e) armature means connected to said driven shaft and arranged to be magnetically attracted relatively toward said stationary winding when it is excited and relatively toward said coupling winding when it is excited; and
(f) current control means connected to said windings for supplying a variable control current thereto and for supplying only said coupling winding with current in a "regular drive" condition of the device, only said brake winding with current in a "regular brake" condition of the device, and both said windings with current during transition from "regular drive" condition to "regular brake" condition and vice versa in which condition when the current in one winding increases, the current in the other winding decreases.

References Cited by the Examiner

UNITED STATES PATENTS

| | | | |
|---|---|---|---|
| 2,533,480 | 12/50 | Leininger et al. | 192—107 |
| 2,642,169 | 6/53 | Hutchison. | |
| 2,695,695 | 11/54 | Gilfillan et al. | 192—111 |
| 2,758,484 | 8/56 | Keltner | 192—51 |
| 2,876,660 | 3/59 | Malick | 192—142 |
| 2,958,406 | 11/60 | Pierce | 192—107 |
| 2,965,203 | 12/60 | White. | |
| 3,019,870 | 2/62 | Even-Tov. | |

FOREIGN PATENTS

| | | |
|---|---|---|
| 722,768 | 1/55 | Great Britain. |

DAVID J. WILLIAMOWSKY, *Primary Examiner.*

THOMAS J. HICKEY, *Examiner.*